(12) United States Patent
Chen et al.

(10) Patent No.: US 7,640,494 B1
(45) Date of Patent: *Dec. 29, 2009

(54) DOCUMENT GENERATION FROM WEB PAGES

(75) Inventors: Xu Chen, Framingham, MA (US); Damon Cooper, Framingham, MA (US); Geoffrey Greene, Medford, MA (US); Michael Nimer, South Boston, MA (US); Sherman Gong, Burlington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/391,108

(22) Filed: Feb. 23, 2009

Related U.S. Application Data (63) Continuation of application No. 10/978,833, filed on Oct. 31, 2004, now Pat. No. 7,496,835.

(51) Int. Cl.
*G06F 17/00* (2006.01)
(52) U.S. Cl. .................. 715/234; 715/149; 715/276
(58) Field of Classification Search ............ 715/234, 715/236, 239, 249, 276, 273
See application file for complete search history.

(56) References Cited

U.S. PATENT DOCUMENTS

| | | |
|---|---|---|
| 6,178,430 B1 | 1/2001 | Cohen et al. |
| 2002/0152236 A1 | 10/2002 | Incertis-Carro |
| 2002/0174145 A1 | 11/2002 | Duga et al. |
| 2002/0194028 A1 | 12/2002 | Johnston et al. |
| 2003/0055876 A1 | 3/2003 | Korala et al. |
| 2005/0021674 A1 | 1/2005 | Kruithof et al. |

OTHER PUBLICATIONS

Tidwell, Doug, HTML to Formatting Objects (FO) coversion guide, Feb. 1, 2003, IBM DeveloperWorks, http://www.ibm.com/developerworks/library/x-xsIfo2app/.

Introduction to ASP, w3schools.com, Archived Mar. 23, 2004, http://www.w3schools.com/ASP/asp_intro.asp.

Kay, Michael, Waht kind of language is XSLT?, Feb. 1, 2001 DeveloperWorks, http://www-128.ibm.com/develoqwerworks/xml/library/x-xslt/?article=xr.

*Primary Examiner*—Adam M Queler (57) ABSTRACT

An output document may be produced from a Web source document by including special markup or output indicators designating output regions in said source document. After detecting the output indicators, any dynamic markup in the Web source document is resolved. An HTML stream is generated that includes the resolved dynamic markup and is then rendered in memory on an internal HTML viewer. The internally rendered HTML is mapped into a print object. Depending on the format of the output document desired, a document transform object is selected that uses the print object to create the output document in the selected format.

17 Claims, 4 Drawing Sheets

FIG. 1

```
<!DOCTYPE HTML PUBLIC "-//W3C//DTD HTML 4.01 Transitional//EN" "http://www.w3.org/TR/html14/loose.com
<html>
<head>
<title>Untitled Document </title>
<meta http-equiv="Content-Type" content="text/html; charset=iso-8859-1">
</head>

<body>
<cfquery datasource="cfdocexamples" name="parksQuery">      } 101
SELECT   parkname, suptmgr from parks
</cfquery>       104   105
<cfdocument format="PDF">
<h1>Park List</h1>
<table width="95%" border="2" cellspacing="2" cellpadding="2" >
    <tr>
        <th>Park</th>
        <th>Manager</th>
    </tr>
    <cfoutput query="parksQuery">
    <tr>
        <td> <font size="-1">#parkname* </font> </td>    107
        <td> <font size="-1">#suptmgr#> </font> </td>    108
    </tr>
    </cfoutput>
    </table>
    </cfdocument>  103
</body>
</html>
```

```
<!DOCTYPE HTML PUBLIC "-//W3C//DTD HTML 4.01 Transitional//EN" "http://www.w3.org/TR/html4/loose.com
<html>
<head>
<title>Untitled Document</title>
<meta http-equiv="Content-Type" content="text/html; charset=iso-8859-1">
</head>
<body>
<query datasource="examples" name="parksQuery">                                        } 414
SELECT  parkname, suptmgr from parks
</query>           407      408   415
       <docOut format="multiple">
       <docSection type="header" format="word">National Parks Report</docSection>
405    <docSection type="footer" format="word">      416
              <paging>Page #docOut.currentpagenumber# of #docOut.totalpagecount#</paging>
       </docSection>                                                           411
<h1>Park List</h1>           409
<table width="95%" border="2" cellspacing="2" cellpadding="2" format="PDF">
       <tr>
              <th>Park</th>
              <th>Manager</th>
       </tr>                                                                               } 410
       <output query="parksQuery">
       <tr>
              <td><font size="-1">#parkname*</font></td>
              <td><font size="-1">#suptmgr#></font></td>
       </tr>
       </output>
       </table>
<p>
   <object>
          <embed src="http://www.movie.com/TeamAmerica.swf" format="SWF"></embed>  } 412
   </object>
</p>                                                                           \
</docOut>  406                                                                 413
</body>                                     400
</html>
```

DOCUMENT GENERATION FROM WEB PAGES

CROSS-REFERENCE TO RELATED APPLICATIONS

This application is a Continuation claiming priority benefit of co-pending and commonly assigned U.S. patent application Ser. No. 10/978,833, filed Oct. 31, 2004, the disclosure of which is hereby incorporated herein by reference.

TECHNICAL FIELD

The present invention relates, in general, to the Internet, and, more specifically, to the generation of printable documents from Web pages.

BACKGROUND

With the growth of the Internet as a medium of commerce, companies have spent a large amount of money developing electronic invoices, Web forms, Web pages Web sites, and the like typically using Hypertext Markup Language (HTML). HTML is a markup language that describes the visual formatting of information. Using a Web browser, the HTML tags are interpreted and used to display the content of the Web page in the desired manner. While this process typically produces visually pleasing results in the presentation of online electronic content, forms, documents, and the like, electronically rendered HTML typically does not print in a predictable manner. Web pages are generally designed for display on a standard computer screen and not on a printed page. A Web page, when laid out on tangible media, may cover the length of several standard pages. If a user selects to print a Web page using the browser's print command, there are few reliable ways to control page breaks, margins, and the like. Moreover, there is generally no way to provide for headers or footers, or to easily break tables across print pages.

Electronic print formatting, such as provided by MACROMEDIA INC.'S FLASHPAPER™, ADOBE SYSTEMS INC.'s PORTABLE DOCUMENT FORMAT™ (PDF), and the like, provide platform independent formatting that may be displayed in the same manner on any variety of computer system, while printing with a high degree of accuracy and fidelity to what is electronically displayed. In order to provide consumers with such print-formatted material, parties will typically create a dual system in which the content is initially presented to a user via an HTML page, but will also provide a link to the same information created in an electronic print format, such as a PDF or FLASHPAPER™ format, or even to a document format, such as MICROSOFT CORPORATION's WORD™ DOC format, COREL COMPUTER COMPANY'S WORDPERFECT™ WPD format, Rich Text Format (RTF), and the like. Therefore, if the consumer desires to print out the information contained on the Web page, he or she selects the link to the print-formatted document and may download and/or print the document in a high print fidelity.

One of the problems with this dual system is maintenance of the system. Updating the underlying HTML is relatively easy. A Web developer or content specialist edits the information or the HTML formatting and the Web page is changed. However, in the dual system, additional steps and separate applications will typically be used, such as WORD™, WORDPERFECT™, and the like, to edit the underlying document which may further be converted into an electronic print format such as PDF through ADOBE SYSTEMS INC.'s ACROBAT™, FLASHPAPER™ through MACROMEDIA INC.'s MACROMEDIA FLASH MX™, and the like. Thus, updating the dual presentation system becomes a considerable amount of work, which typically translates into a higher cost.

Solutions have been presented that allow a document format, such as PDF, FLASHPAPER™, WORD™ DOC, WORDPERFECT™ WPD, RTF, or the like, to be printed from the output of an HTML document. In such applications, the HTML code that is written is eventually converted into an electronic print-formatted document, such as PDF PDF, FLASHPAPER™, WORD™ DOC, WORDPERFECT™ WPD, RTF, or the like, when the Web page is displayed or printed. In these systems, however, a proprietary intermediate markup language is typically used. The HTML is usually converted into this proprietary markup, which is then rendered into the target format.

A print-formatted document may also be created simply by using a printer driver specifically directed for the particular print formatting. ADOBE SYSTEMS INC.'s ACROBAT DISTILLER™, is a print driver that generates a PDF file output of any document printed from the active application. For example, if a user desires to print a Web page directly from MICROSOFT CORPORATION's INTERNET EXPLORER™, he or she may select the ACROBAT DISTILLER™ print driver, and then select the print function of INTERNET EXPLORER™. The target Web page will be printed to a PDF document. However, the print object processed by ACROBAT DISTILLER™ is still prepared by INTERNET EXPLORER™, which means that headers, footers, page breaks, and the like, may or may not be handled in a predictable manner. The resulting PDF file may not faithfully reflect the Web page as it appeared in the Web browser. Moreover, because the ACROBAT DISTILLER™ was used in this manner, the metadata supporting the PDF file will generally not include the actual text of the printed document. The PDF document of the printed Web page will likely be a complete graphical rendition of that page. This complete graphical rendition typically diminishes the quality of the print out in addition to making the resulting PDF document non-text searchable.

BRIEF SUMMARY

The present invention is directed to a system and method for outputting a formatted document from a source Web page processed by an application server. The application server detects any document output tags or active code within the source Web page. If any such tags or code is located, it resolves the dynamic mark up located between the document output tags. A raw HTML stream is generated that includes the HTML that was generated when the dynamic tags or code were resolved. This raw HTML stream is rendered onto an internal browser in memory. A print renderer then creates a print object, which is a set of vector descriptions, instructions, and coordinates from the HTML rendered in memory on the internal browser. The print object uses a format-specific document generator object(s) to form or create the output document. The result is an output document that is both electronically viewable and also printable to a high fidelity, tangible representation of the electronically viewable document.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention is set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
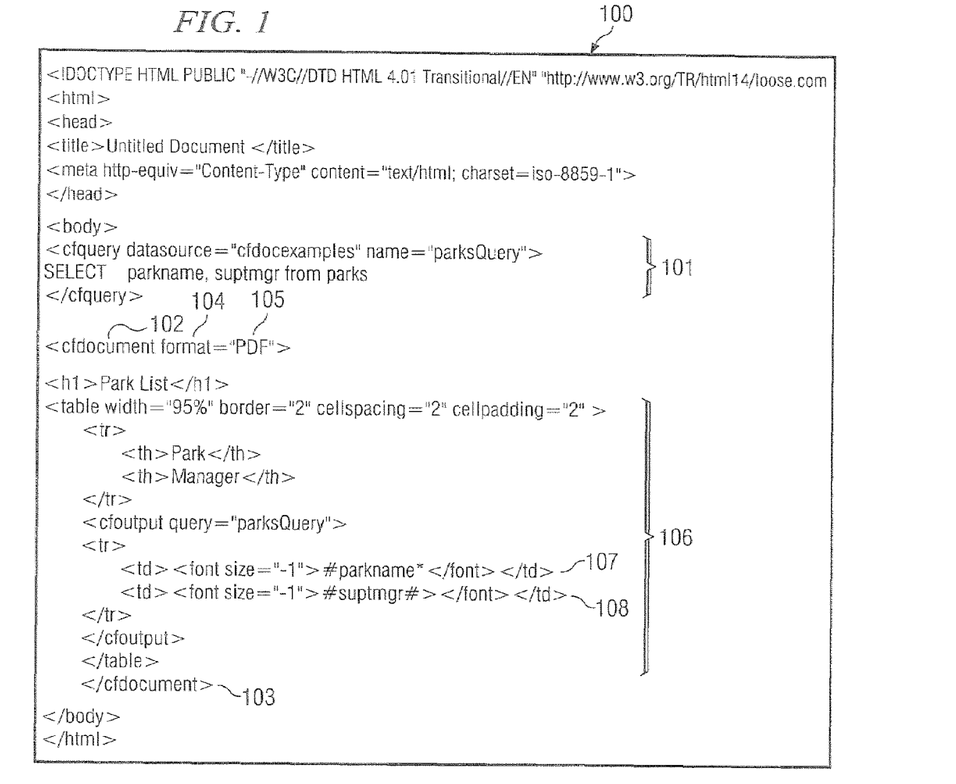
FIG. 1 is a code listing of a Web document configured to operate according to one embodiment of the present invention.

FIG. 1 is a code listing of Web source document 100 configured to operate according to one embodiment of the present invention. Web source document 100 includes database query 101 which is a dynamic instruction that interacts with an external database at runtime to obtain information responsive to the query request. The information that is retrieved is used to populate columns 107 and 108 of table 106 at runtime. Print tags 102 and 103 around the HTML code indicate that the developer desired to output the resulting HTML from this source file into a particular document format. In the illustrated embodiment, document output tag 102 includes format attribute 104 that indicates PDF 105. Format attribute 104 designates the particular print or document format that will be used to output the document. Thus, as indicated by PDF 105, the output of Web source document 100 will be in PDF format.

It should be noted that Web source document 100 is illustrated in MACROMEDIA INC.'s COLDFUSION MARKUP LANGUAGE™ (CFML™). The use of CFML™ is intended only to provide an example of one embodiment of the present invention. Any other type of active page programming or markup language may be used in various embodiments of the present invention. For example, Web source document 100, may be written in SUN MICROSYSTEMS INC.'s JAVA SERVER PAGES™ (JSP™), MICROSOFT CORPORATION's ACTIVE SERVER PAGES™ (ASP™), or the like.

Additionally, any type of compatible application server may be used in implementing the various embodiments of the present invention, such as MACROMEDIA INC.'s COLDFUSION™, JRUN™, BEA's WEBLOGIC™, IBM's WEBSPHERE™, and the like. The various embodiments of the present invention are not limited to a single application server type or active server page language.

Figure 2:
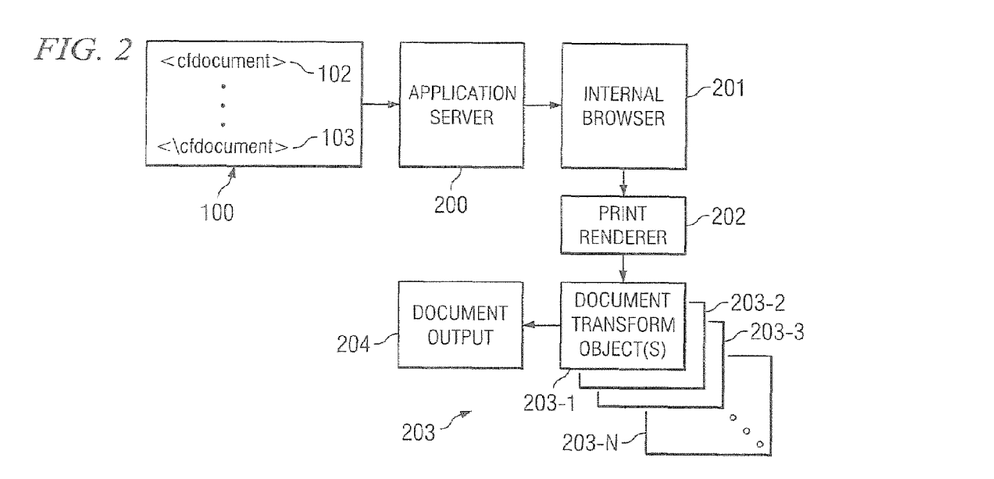
FIG. 2 is a block diagram illustrating an application server configured to operate according to one embodiment of the present invention.

FIG. 2 is a block diagram illustrating application server 200 configured to operate according to one embodiment of the present invention. As application server 200 serves Web source document 100, it encounters document print tab 102 which triggers the document output logic for implementing the embodiment of the present invention. Application server 200 begins by resolving any of the dynamic tags or code between document output tags 102 and 103. Dynamic tags or code may indicate actions, such as interacting with remote databases, calculating data, generating code, populating variables, or the like. Application server 200 resolves the dynamic tags and code and populates columns 107 and 108 (FIG. 1) with data from a remote database. It then generates table 106 (FIG. 1) into a raw HTML stream.

The raw HTML stream is then rendered in memory by internal browser 201. Internal browser 201 may be an HTML viewer or browser that is capable of rendering HTML as it would be displayed on a display screen. One example of such an HTML viewer is ICESOFT TECHNOLOGIES INC.'s ICEREADER™. ICEREADER™ provides HTML rendering capabilities to SUN MICROSYSTEMS INC.'s JAVA™ applications. Internal browser 201 takes the raw HTML stream from application server 200 and creates a browser window in memory that contains the rendered HTML from the raw HTML stream. Because it is rendered in memory, the browser window and rendered HTML are not visible to a user of the system, but only exist mapped out in memory. Once application server 200 detects that internal browser 201 has completed the rendering of the raw HTML stream, it then calls print renderer 202 to create a print object for "printing" the rendered HTML.

Print renderer 202 is capable of generating a print object, which is a detailed set of instructions, descriptors, and coordinates that may used by a printing device to draw the rendered HTML onto a piece of physical, tangible media. An example of such a print renderer is also found in the ICEREADER™ HTML viewer. However, the intended result is to output or "print" to a formatted document. Therefore, "printing," as used in this stage of the process does not mean printing to a tangible medium by a typical printing device using ink, toner, or the like. Print renderer 202 generates the print object the represents the drawing of the rendered HTML; however, instead of passing this print object to a printing device driver, application server 200 directs the print object to one or more Document transform object(s) 203.

Document transform object(s) 203 essentially take the place of a printer device driver. In typical operation, the print object would instruct the printer device driver exactly how to draw the material being printed. Thus, the printer device driver understands the format, instructions, methods, and the like of the print object, and also understands how to implement those instructions, methods, and the like on the specific printer that it corresponds to.

In the present invention, document transform object(s) 203 understands the format, instructions, methods, and the like, used by the print object generated by print renderer 202 and is able to transform those instructions and methods into drawing the information (here, the rendered HTML) to a specific formatted document, such as PDF, FLASHPAPER™, WORD™ DOC, RTF, or the like. Depending on the specific format desired for output document 204, a format-specific transform object instance is created to "print" the rendered HTML to the desired format of output document 204. Because format attribute 104 (FIG. 1) designated PDF 105, document transform object(s) 203 was selected for the print object to produce document output 204, in a PDF format. The party accessing Web source document 100 may then view document output 204 in an appropriate viewer, such as ADOBE SYSTEMS INC.'s ACROBAT™ viewer. Furthermore, the party may print document output 204 which maintains the graphical fidelity and quality of document output 204 as displayed in the appropriate viewer.

It should be noted that a standard format for such a document transform object is SUN MICROSYSTEMS INC.'s JAVA™ GRAPHICS2D™ format (G2D). G2D format has become a de facto standard for Web based graphics and text rendering. The G2D objects are format-specific. For example, to result in a FLASHPAPER™ formatted document, a specific FLASHPAPER™ G2D object would be created to use with the print object. To result in a different document format, a different G2D object is used, such as a PDF G2D, an RTF G2D, and the like. However, the various embodiments of the present invention are not limited to implementing document transform objects in a G2D format.

The example embodiment shown in FIG. 2 illustrates document transform object(s) 203 as multiple instances, 203-1-203-N. The rendered HTML may result in a multi-page document. Application server 200 includes logic to calculate the specific number of pages that will need to be printed based, in part, on the resolution of the dynamic tags and code, the length of the raw HTML stream, and the like. The embodiment of the present invention illustrated in FIG. 2 associates each page in the entire document with its own transform object. Therefore, document transform object(s) 203-1-203-N indicates that an N-page document is to be produced in document output 204.

Application server 200 recognizes that format attribute 104 (FIG. 1) selects a resulting output of PDF 105 (FIG. 1). Therefore, each instance of document transform object(s) 203-1-203-N is a separate instance of the same transform object for PDF formats. However, even though separate instances of document transform object(s) 203 are used to print each separate page, application server 200 keeps track that each of the pages belongs to the same document or the same print tags, i.e., document output tags 102 and 103, and joins each separately printed page to generate a single document for document output 204.

It should be noted that in processing a Web source document that is different than Web source document 100, the embodiment of the present invention illustrated in FIG. 2 may assign document transform objects to each separate page that do not result in the same format. However, these multiple formats will still be joined by application server 200 into a single document for document output 204. For example, a first page to be printed may use a document transform object for WORD™ DOC documents, while the second page to be printed may use a document transform object for a MACROMEDIA FLASH™ small web file (SWF), while the third page to be outputted may use a document transform object for a PDF file. The resulting single document would have a first WORD™ DOC page, a second SWF page, and a third PDF page, all within the same document.

With the prevalence of the Internet, many document formats now support hyperlink technology within the content of a document. For example, PDF documents may include hyperlinks that cause the viewer to jump to the destination of the link, either internally to a bookmark or anchor, or externally to another file or Universal Resource Locator (URL). Other document types, such as WORD™ DOC, WORDPERFECT™ WPD, FLASHPAPER™, and the like, each also include this hyperlinking technology. Additional and/or alternative embodiments of the present invention may include logic that detects such link in the HTML document and maintains those links through to the conversion to the final print document format.

Figure 3:
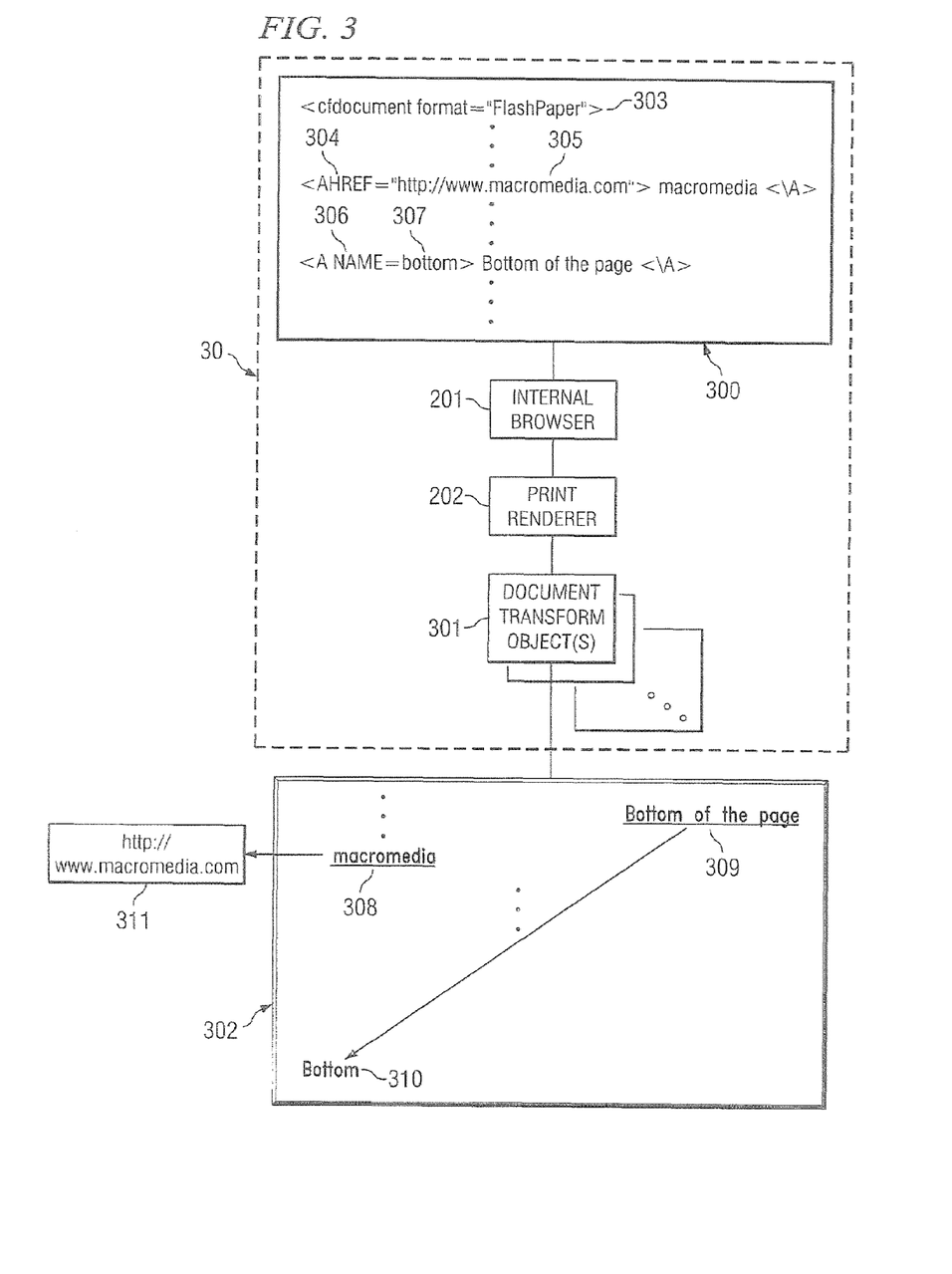
FIG. 3 is a block diagram illustrating an application server configured to operate according to another embodiment of the present invention.

FIG. 3 is a block diagram illustrating application server 30 configured to operate according to another embodiment of the present invention. Web source document 300 includes external link statement 304 pointing to URL 305, indicating http://www.macromedia.com and internal link statement 306 pointing to anchor 307, indicating "bottom," or the bottom of the page. As the raw HTML stream of Web source document 300 is processed by internal browser 201, external link statement 304 and internal link statement 306 are recognized as hyperlinks. Internal browser 201 causes the HTML for external link statement 304 and internal link statement 306 to be rendered indicating that they represent hyperlinks. Furthermore, because hyperlinks exist, internal browser 201 saves additional metadata associated with the rendered locations of external link statement 304 and internal link statement 306. This additional metadata represents the address or location of the linking. Therefore, internal browser 201 would save the URL, http://www.macromedia.com, associated with the location of rendered external link statement 304, and would save the bookmark location, bottom, associated with the location of the rendered internal link statement 306.

Output document 302 is generated by document transform object(s) 301 after the print object is generated by print renderer 202 using the HTML rendered on internal browser 201. Document transform object(s) 301 generates FLASHPAPER™ formatted output. This particular transform engine is selected by application server 30 because document output tag 303 indicates to output the resulting document in FLASHPAPER™ format. Document transform object(s) 301 uses the additional linking metadata to establish hyperlinks at the rendered locations of external link statement 304 and internal link statement 306. Therefore, output document 302 maintains the same hyperlinks that originally existed in Web source document 300. If the user viewing output document 302 were to select Bottom of page link 309, the FLASHPAPER™ viewer would change focus to bottom anchor 310. Similarly, if the user were to select URL link 308, the FLASHPAPER™ viewer would attempt to call the URL of macromedia Website 311.

It should be noted that in the various embodiments of the present invention, completing the external link may be implemented by calling the URL for macromedia Website 311 in a separate browser window, by generating a FLASHPAPER™ formatted output document of macromedia Website 311 for use in the FLASHPAPER™ viewer, or any other available methods. The various embodiments of the present invention are not limited to either one or the other of these linking options, but may use any number of different methods for implementing the assigned linking.

Figure 4:
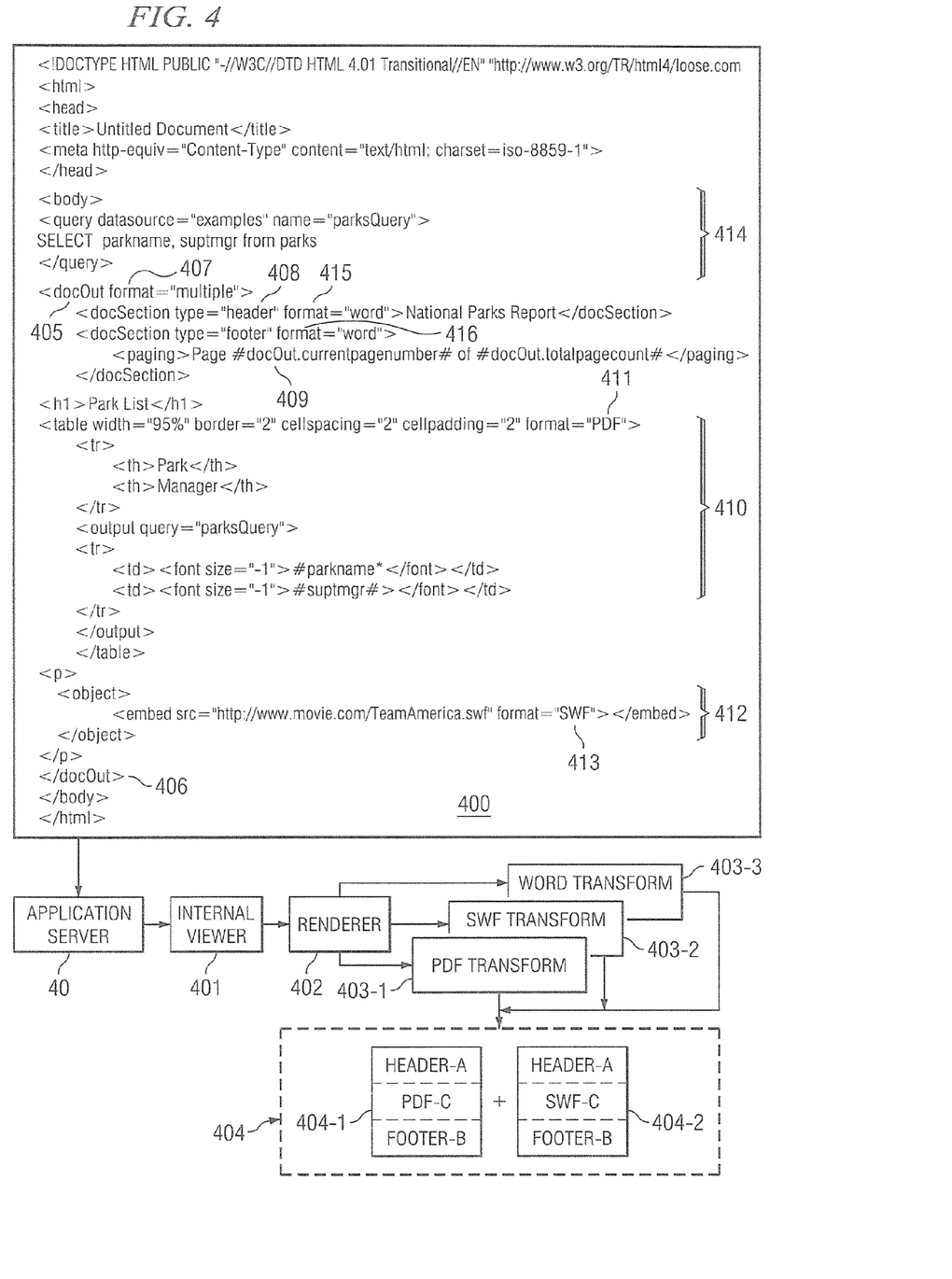
FIG. 4 is a block diagram illustrating an application server configuration to operate according to another embodiment of the present invention.

FIG. 4 is a block diagram illustrating application server 40 configured to operate according to another embodiment of the present invention. Source document 400 includes markup and code for performing dynamic operations as well as for directing the output of the resulting Web page to be printed to a rich formatted document. Query code 414 controls access to a remote database at runtime to obtain data to populate table 410. Output tags 405 and 406 trigger output logic in application server 40 and defines the bounds of source document 400 that are to be included in the rich document output.

Application server 40 processes source document 400 to resolve any of the dynamic code and tags present. Application server 40 then generates a raw HTML stream which is communicated to internal viewer 401 for rendering on an internal browser window in memory. When application server 40 determines that internal viewer 401 has completed loading the raw HTML stream, it calls renderer 402 to create a print object for printing or outputting the document.

The output defined by source document 400 included format attribute 407 that indicated a multiple format document. Header section 408 includes format attribute 415 that defines the header of the output to be in WORD™ format. Footer section 409 includes format attribute 416 that also defines the footer to be in WORD™ format. Table 410 includes format attribute 411 that defines the table to be output in PDF format. Finally, embedded movie 412 includes format attribute 413 that defines the output of the embedded movie to be a SWF.

Header section 408 and footer section 409 appear on each page of the output document. Therefore, renderer 402 creates separate print objects for each one. Application server 40 also calls separate transforms, PDF transform 403-1 and SWF transform 403-2 for each page of the resulting document. Separate transforms are used not only because of the different document formats defined in source document 400, but are also called because source document 400 outputs to two pages. Application server 40 determines that the resulting document would comprise two pages when generating the raw HTML stream. The embodiment illustrated in FIG. 4 calls a separate transform for each page determined to print in the output document. If the pages are to be separate formats, as illustrated, then instances of different transforms are called. However, if the pages are to be output in the same format, multiple instances of the same transform are called.

When renderer 402 produces the print objects for the rendered HTML, transforms, PDF transform 403-1, SWF transform 403-2, and WORD™ transform 403-3, are called to transform the print objects into rich output document 404. Application server 40 combines the header and footer results from WORD™ transform 403-3 on page 404-1A and 404-1B with the PDF results from PDF transform 403-1 on page 404-1C to create page 404-1. Similarly, application server 40 combines the second header/footer results on page 404-2A and 404-2B with the SWF results from SWF transform 403-2 to create page 404-2. Together application server 40 combines pages 404-1 and 404-2 into rich output document 404. Thus, several separate outputs from the transforms, PDF transform 403-1, SWF transform 403-2, and WORD™ transform 403-3, are combined by application server 40 into a single document, rich output document 404.

It should be noted that the code depicted in source document 400 is pseudocode only and does not represent any particular script or code, such as HTML, JAVA™, or the like. The purpose of the pseudocode is merely to demonstrate the universal applicability of the various embodiments of the present invention. The present invention is not limited to any one particular Internet-related language or general computer language.

Figure 5:
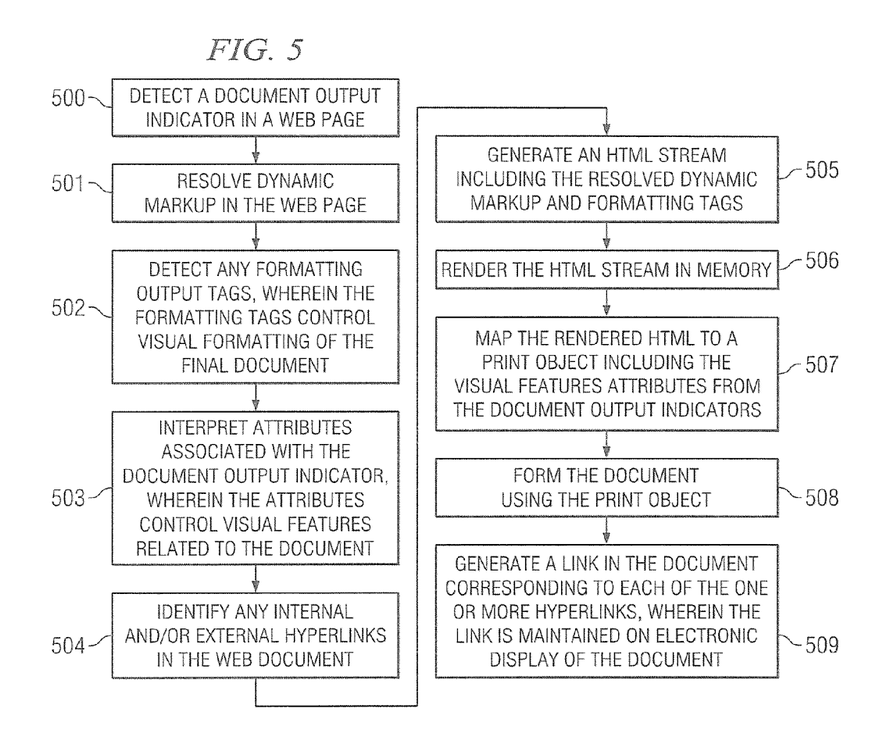
FIG. 5 is a flowchart illustrating example steps executed to implement one embodiment of the present invention.

FIG. 5 is a flowchart illustrating example steps executed to implement one embodiment of the present invention. In step 500, a document output indicator is detected in a Web source page. Any dynamic markup in the Web page is resolved in step 501. In step 502, any formatting output tags are detected, wherein the formatting tags control visual formatting of the final document. One or more attributes associated with the document output indicator are interpreted, in step 503, wherein the attributes control visual features related to the document. In step 504, any internal and/or external hyperlinks are identified in the Web document. Generate An HTML stream is generated, in step 505, that includes the resolved dynamic markup and formatting tags. In step 506, the HTML stream is rendered in memory, after which it is then mapped, in step 507 to a print object that includes the visual features attributes from the document output indicators. The document is then formed, in step 508, using the print object. In step 509, a link is generated in the document corresponding to any hyperlinks that were found.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 6:
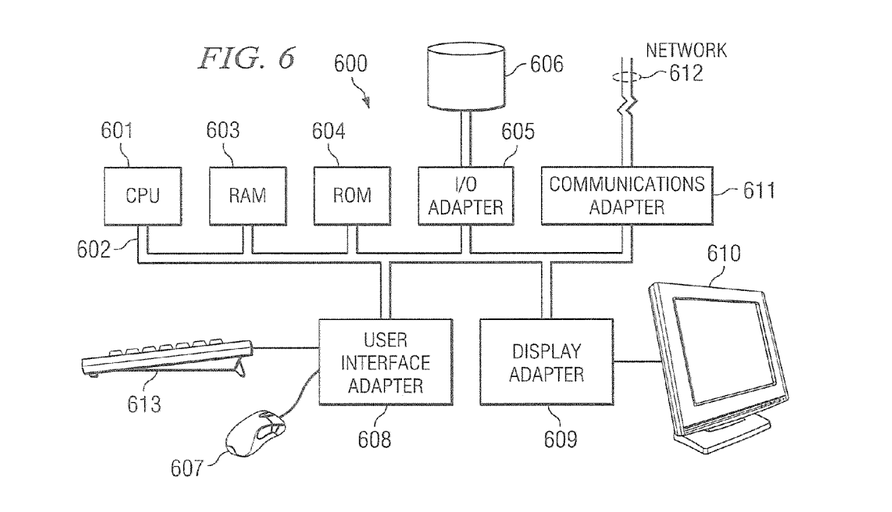
FIG. 6 illustrates a computer system adapted to use embodiments of the present invention.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, etcetera. Note that the printer may be a printer (e.g., dot matrix, laser, etcetera), a fax machine, scanner, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, etcetera, to the computer system 600. The display card 609 is driven by CPU 601 to control the display on display device 610.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer program product having a computer storage medium with computer program logic recorded thereon, said computer program product comprising:
 code for detecting cfdocument tags in a web source page;
 code for generating a hypertext markup language (HTML) stream representing a portion of said web source page between said cfdocument tags;
 code for rendering said HTML stream in memory;
 code for generating a detailed set of drawing instructions from said rendered HTML stream;
 code for reading one or more format attributes from said cfdocument tags; and
 code for transforming said detailed set of drawing instructions into one or more formatted electronic documents according to one or more formats identified by said one or more format attributes, the format of each document determined by the one or more format attributes.

2. The computer program product of claim 1 further comprising:
 code for resolving dynamic code in said portion of said web source page, wherein said generated HTML stream includes said resolved dynamic code.

3. The computer program product of claim 1 further comprising:
 code for generating HTML instructions corresponding to said one or more format attributes;
 wherein said code for generating further comprises:
 code for including print instructions implementing said HTML instructions into said detailed set of drawing instructions.

4. The computer program product of claim 1 further comprising:
 code for detecting one or more formatting tags in said HTML stream, wherein said one or more formatting tags determine in said one or more formatted electronic documents one or more of:
 a page break;
 a section break;
 a header;
 a footer; and
 a page number.

5. The computer program product of claim 1 wherein said one or more format attributes comprises one or more of:
 paper size;
 margin size;
 page orientation;
 encryption information;
 an embedded font; and
 document scale.

6. The computer program product of claim 1 further comprising:
 code for identifying one or more hyperlinks in said web source page;
 code for generating a link in said one or more formatted electronic documents corresponding to each of said one or more hyperlinks.

7. The computer program product of claim 6 wherein said one or more hyperlinks comprise one or more of:
 an internal link to an anchor within said web source page; and
 an external link to another web source page.

8. The computer program product of claim 1 wherein said code for transforming comprises:
 code for calling a transform object of one or more transform objects that uses said detailed set of drawing instructions to create said one or more formatted electronic documents.

9. The computer program product of claim 8 wherein a format of said one or more formatted electronic documents is controlled by a type of said transform object.

10. The computer program product of claim 8 further comprising:
 code for determining a number of pages of said one or more formatted electronic documents using said HTML stream;
 code for assigning one of said one or more transform objects for each of said number of pages.

11. A computer implemented method comprising:
 detecting, under control of a central processing unit (CPU), output tags in a web source document stored in a storage device coupled to said CPU;
 generating an HTML stream representing a portion of said web source document between said output tags;
 rendering a visual representation of said HTML stream in memory;
 generating a print object from said rendered visual representation;
 reading one or more format attributes from said output tags;
 selecting one or more transformation objects from a plurality of transformation objects based on said one or more format attributes; and
 processing said print object with said selected one or more transformation objects to create one or more formatted electronic documents.

12. The computer implemented method of claim 11 further comprising:
 resolving dynamic code in said portion of said web source document, wherein said generated HTML stream includes said resolved dynamic code.

13. The computer implemented method of claim 11 wherein said output tags comprise cfdocument tags.

14. The computer implemented method of claim 11 further comprising:
 identifying one or more hyperlinks in said web source document;
 generating a link in said one or more formatted electronic documents corresponding to each of said one or more hyperlinks.

15. The computer implemented method of claim 14 wherein said one or more hyperlinks comprise one or more of:
 an internal link to a position within said web source document; and
 an external link to another web source document.

16. A system comprising:
 a central processing unit (CPU); and
 a computer storage medium;
 program segments recorded on said computer storage medium, wherein, when executed by the central processing unit, said executed program segments define an application server configured to:

detect output tags in a web source document;

generate an HTML stream representing a portion of said web source document between said output tags;

render a visual representation of said HTML stream in memory;

generate a print object from said rendered visual representation;

read one or more format attributes from said output tags;

select one or more transformation objects from a plurality of transformation objects based on said one or more format attributes; and process said print object with said selected one or more transformation objects to create one or more formatted electronic documents.

17. The system set forth in claim 16, wherein the application server is further configured to:

resolve dynamic code in said portion of said web source document, wherein said generated HTML stream includes said resolved dynamic code.

* * * * *